(12) United States Patent
Kim et al.

(10) Patent No.: US 7,997,836 B2
(45) Date of Patent: Aug. 16, 2011

(54) INDEXABLE TYPE CUTTING TOOL

(75) Inventors: Young-Heum Kim, Cheongju (KR);
Joo-Oh Kim, Cheongju (KR);
Kwan-Hee Lee, Cheongju (KR);
Hak-Kyu Kim, Cheongju (KR)

(73) Assignee: Korloy Inc. (KR)

( * ) Notice: Subject to any disclaimer, the term of this patent is extended or adjusted under 35 U.S.C. 154(b) by 1234 days.

(21) Appl. No.: 11/572,989

(22) PCT Filed: Aug. 16, 2005

(86) PCT No.: PCT/KR2005/002667
§ 371 (c)(1),
(2), (4) Date: Jan. 30, 2007

(87) PCT Pub. No.: WO2006/036041
PCT Pub. Date: Apr. 6, 2006

(65) Prior Publication Data
US 2008/0003072 A1    Jan. 3, 2008

(30) Foreign Application Priority Data

Aug. 18, 2004  (KR) .................. 10-2004-0065143
Jun. 20, 2005  (KR) .................. 10-2005-0052934

(51) Int. Cl.
*B23B 51/02* (2006.01)
(52) U.S. Cl. .......... 408/59; 408/230; 408/233; 408/713; 407/40; 407/48
(58) Field of Classification Search ............ 408/57, 408/59, 230, 233, 713; 407/48
See application file for complete search history.

(56) References Cited

U.S. PATENT DOCUMENTS

| | | | | |
|---|---|---|---|---|
| 2,400,856 | A | * | 5/1946 | Thompson .................. 408/233 |
| 3,076,357 | A | * | 2/1963 | Benjamin et al. ............ 408/211 |
| 3,333,489 | A | * | 8/1967 | Mossberg ..................... 408/60 |
| 4,493,596 | A | * | 1/1985 | Grunsky et al. .............. 408/233 |
| 4,854,789 | A | * | 8/1989 | Evseanko, Jr. ............... 408/125 |
| 5,649,794 | A | * | 7/1997 | Kress et al. ..................... 408/83 |
| 5,782,589 | A | | 7/1998 | Cole |
| 5,863,157 | A | * | 1/1999 | Harano et al. .................. 407/42 |
| 6,071,045 | A | | 6/2000 | Janness |
| 6,196,769 | B1 | | 3/2001 | Satran et al. |
| 6,406,226 | B2 | * | 6/2002 | Kojima ......................... 408/223 |
| 6,481,938 | B2 | * | 11/2002 | Widin ........................... 408/226 |

(Continued)

FOREIGN PATENT DOCUMENTS

| | | | |
|---|---|---|---|
| DE | 10307213 A1 | * | 9/2004 |
| JP | 2000158221 A | * | 6/2000 |
| JP | 2001277011 A | * | 10/2001 |

(Continued)

*Primary Examiner* — Eric A Gates
(74) *Attorney, Agent, or Firm* — Park & Associates IP Law, P.C.

(57) ABSTRACT

An indexable type cutting tool includes a drill having a shank and a drill body which extends from the shank, the drill body being defined with body flutes, and being formed with an insert seat which has seat side surfaces and a seat bottom surface and body flank surfaces and body thinning surfaces; a drill insert fitted into the insert seat of the drill body, having cutting edges and an insert bottom surface which is brought into close contact with the seat bottom surface, formed with insert flutes and insert side surfaces which are brought into close contact with the seat side surfaces, and defined with a through-hole which passes through the insert side surfaces; and a fastening screw for fastening the drill insert fitted into the insert seat to the drill.

13 Claims, 8 Drawing Sheets

| U.S. PATENT DOCUMENTS | | | | |
|---|---|---|---|---|
| 6,514,019 B1 * | 2/2003 | Schulz | | 408/59 |
| 6,582,165 B1 * | 6/2003 | Baba | | 408/233 |
| 7,311,480 B2 * | 12/2007 | Heule et al. | | 408/233 |
| 2001/0026738 A1 * | 10/2001 | Kojima | | 408/227 |

| FOREIGN PATENT DOCUMENTS | | | |
|---|---|---|---|
| JP | 2006205290 A | * | 8/2006 |
| KR | 1020030046894 | | 6/2003 |
| KR | 10-2005-0052934 | * | 6/2005 |

* cited by examiner

[Fig. 1]
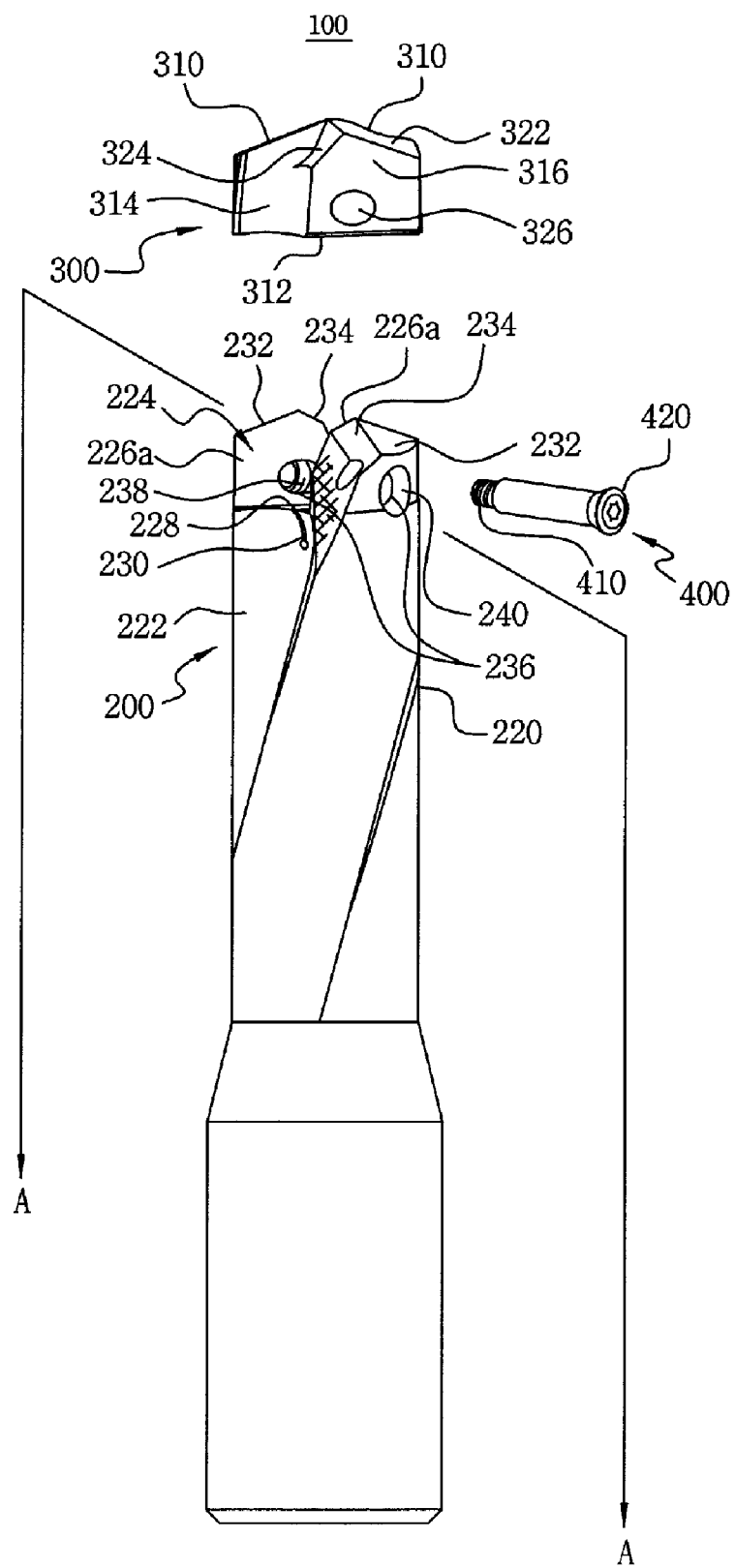

[Fig. 2]
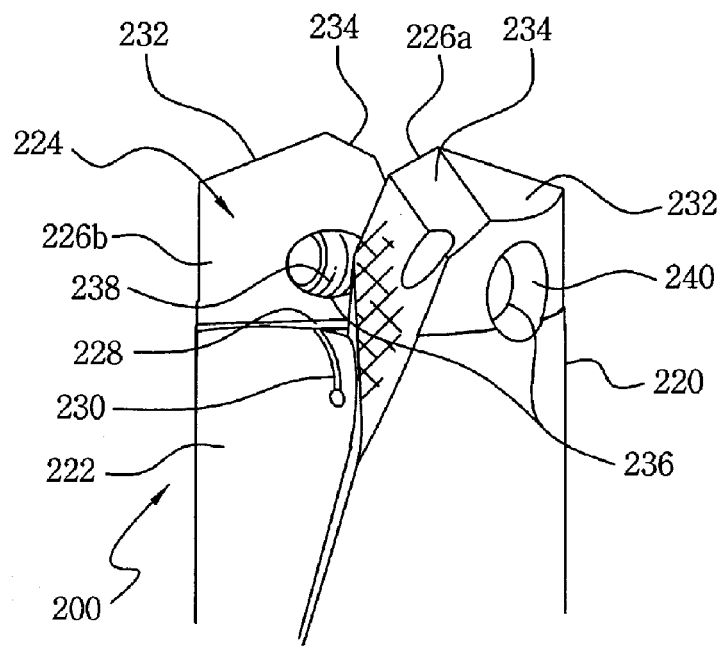
[Fig. 3]
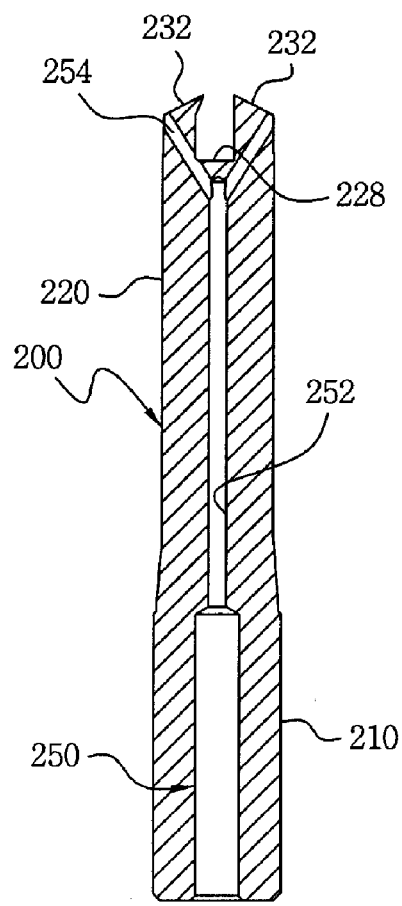

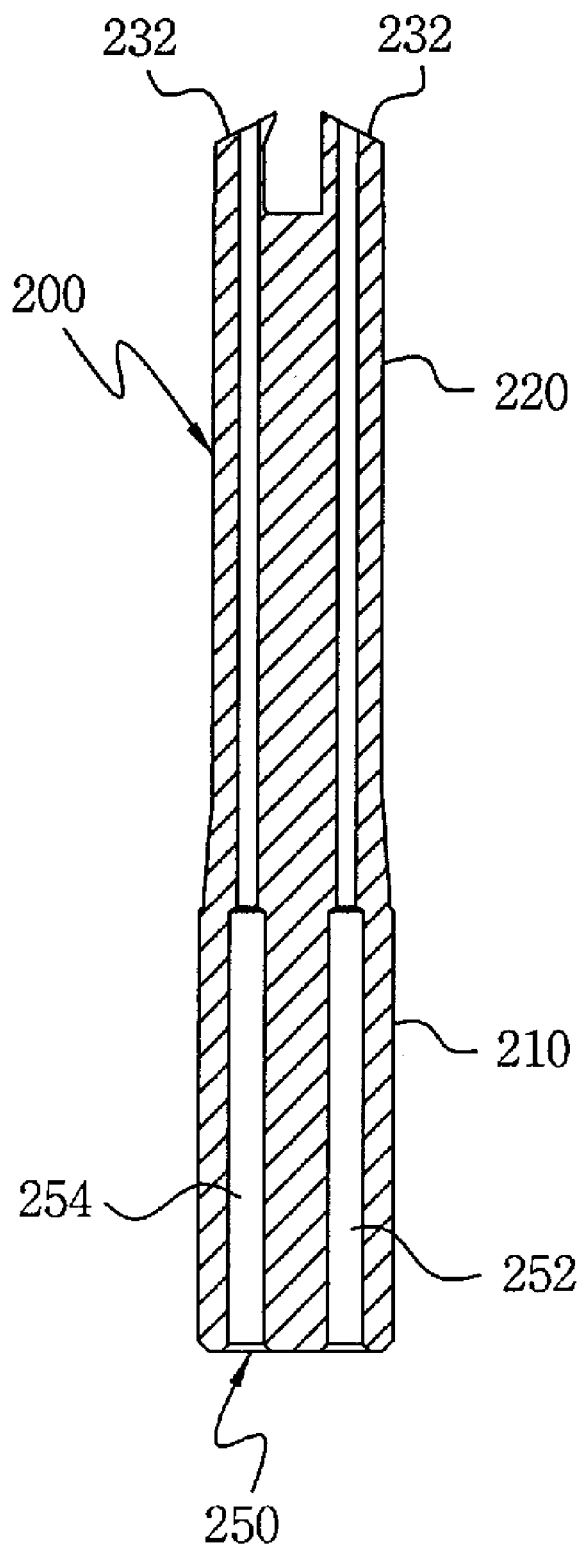
[Fig. 4]

[Fig. 5]
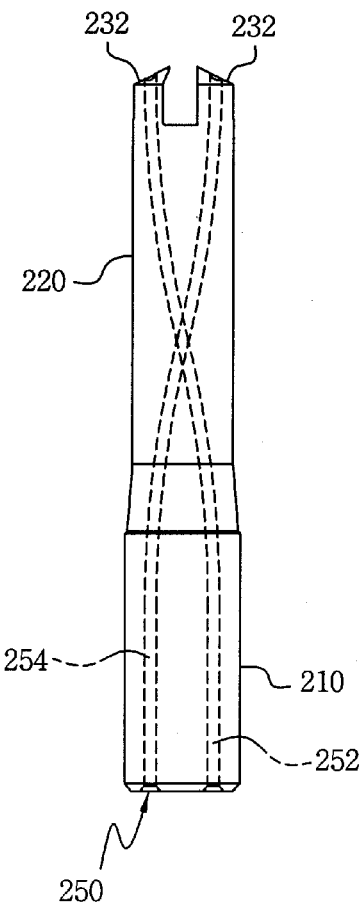
[Fig. 6]
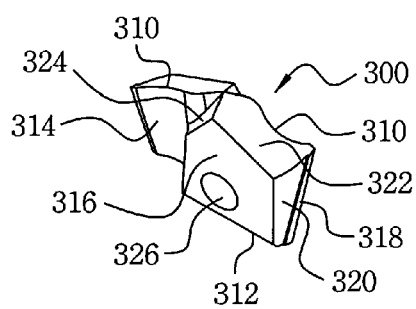
[Fig. 7]
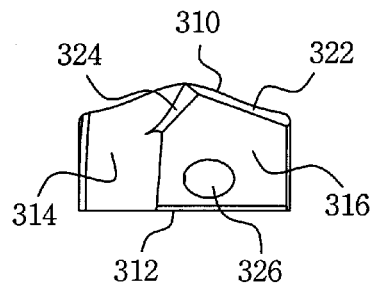

[Fig. 8]
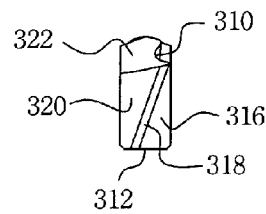
[Fig. 9]
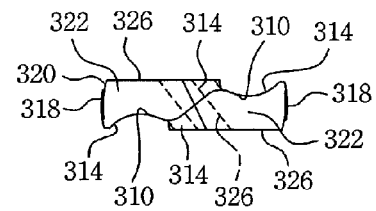
[Fig. 10]
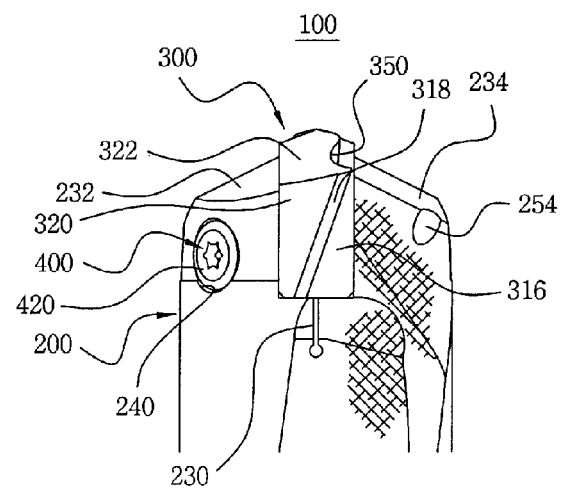
[Fig. 11]
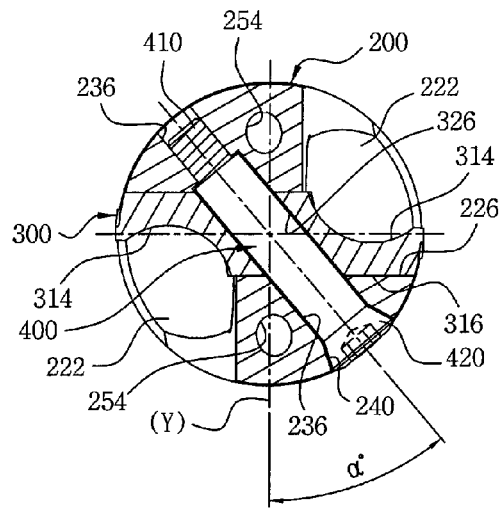

[Fig. 12]
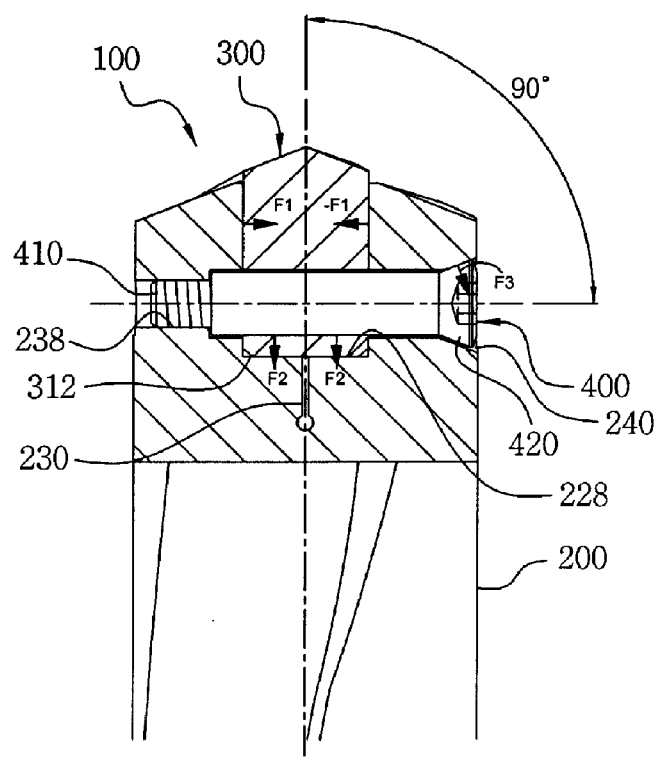
[Fig. 13]
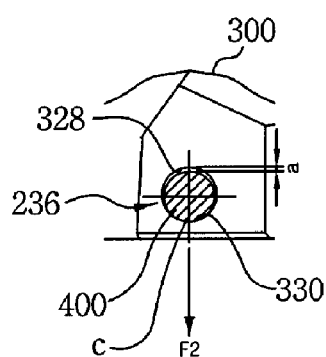
[Fig. 14]
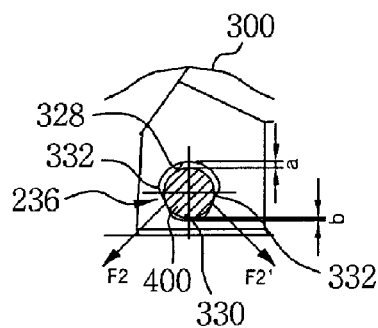

[Fig. 15]
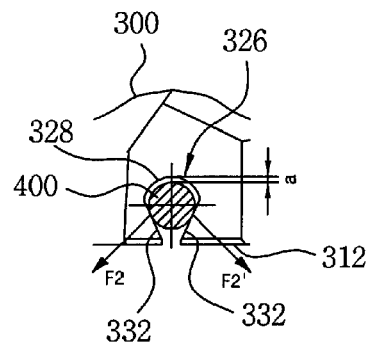
[Fig. 16]
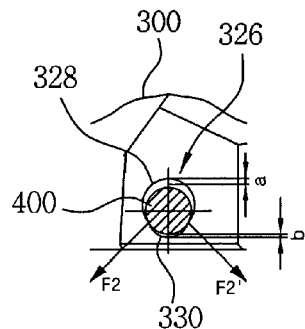
[Fig. 17]
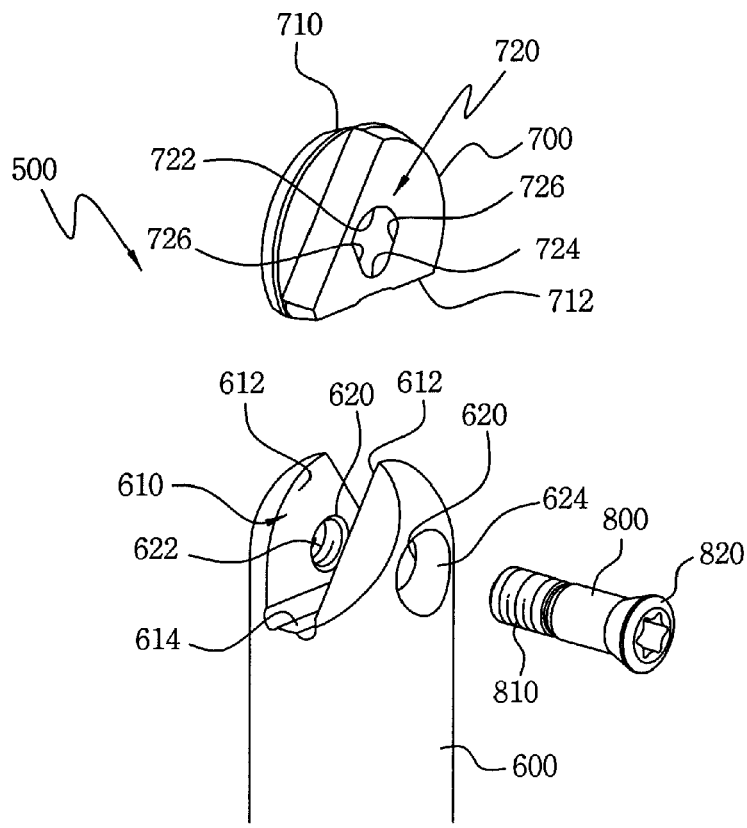

[Fig. 18]
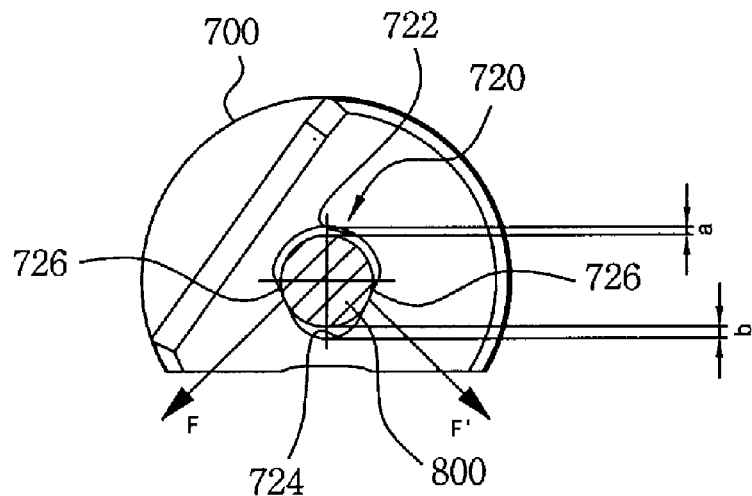
[Fig. 19]
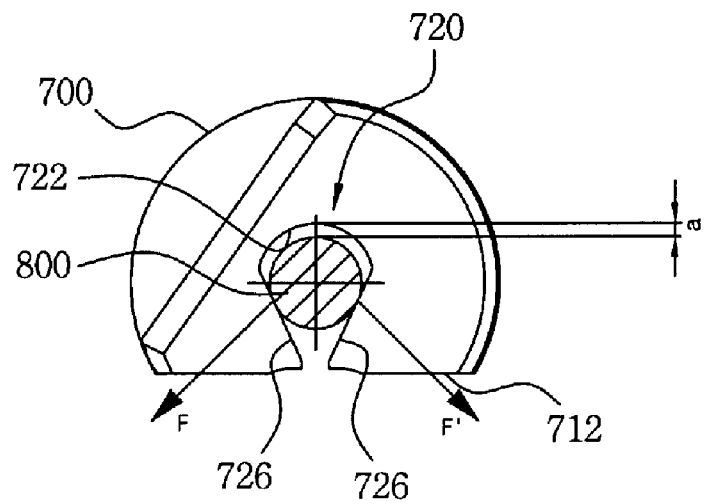
[Fig. 20]
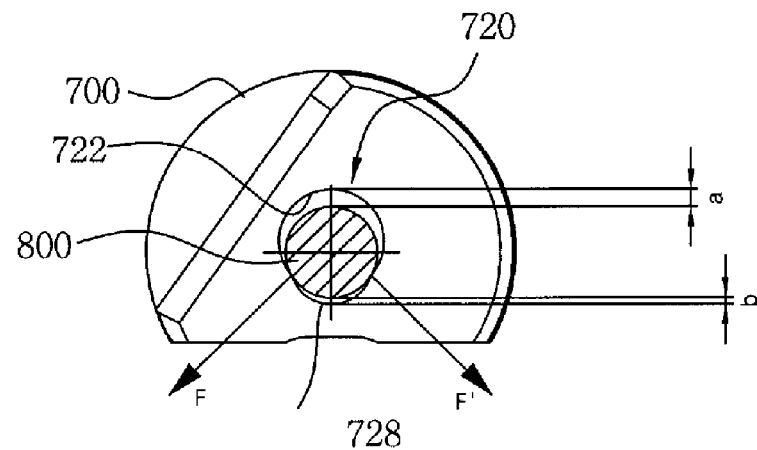

INDEXABLE TYPE CUTTING TOOL

TECHNICAL FIELD

The present invention relates to a drill or a ball end mill among indexable type cutting tools. More particularly, the present invention relates to an indexable type cutting tool wherein an insert can be simply, quickly and precisely fastened to a tool body, and the through-hole of the insert is modified in its profile so that the rotation center of the insert can easily correspond to the rotation center of the tool body, whereby a manufacturing cost of the tool can be reduced due to easy manufacture of the tool, and it is possible to secure a sufficient chip discharge space, thereby improving a cutting performance of the tool.

BACKGROUND ART

As generally known in the art, cutting tools are used to cut ferrous metals, non-ferrous metals, and nonmetallic materials. The cutting tools are mounted to machine tools to cut a workpiece into a desired shape. Usually, a cutting tool is composed of a cutting insert which has cutting edges and a tool body to which the cutting insert is fastened.

Cutting tools are divided into brazing type cutting tools and indexable type cutting tools depending upon a method for fastening the cutting insert to the tool body. In the brazing type cutting tools, the cutting insert is permanently brazed to a portion of the tool body. In the indexable type cutting tools, the cutting insert is mounted to and dismounted from the tool body by fastening means arranged on the tool body.

In the indexable type cutting tools, when the available lifetime of the cutting edges of the cutting insert ends, since the cutting insert can be simply replaced with new one within a short time, it is possible to cope with the disadvantage of the conventional brazing type cutting tools, that a highly skilled person must re-grind the cutting edges of the cutting insert. For this reason, the indexable type cutting tools are currently adopted in most cutting tools.

There are two methods for cutting a metal using a cutting tool. In a first method, the cutting edges of a cutting tool which is fixedly held are brought into contact with a workpiece made of a metallic material, which is rotated, to perform a cutting function. In a second method, after a tool having cutting edges, that is, a cutting insert is fastened to a machine tool using a holder, the cutting tool is rotated to be brought into contact with or pass through the workpiece which is fixedly held, to machine the workpiece into a desired shape.

A drilling technique belongs to the second method as described above. In a drilling method, with a workpiece fixedly held, a drilling tool is rotated to create a hole through the workpiece.

Recently, when compared to an integrated solid drilling tool which is integrally formed of one material and has a drill body, flutes and cutting edges, an indexable type drilling tool in which a cutting insert is replaceably fastened to a drill body is widely used as a drilling tool. A configuration of the indexable type drilling tool has been changed from one in which a plurality of cutting inserts are fastened to the circumferential outer surface of the distal end of the drill body to another in which only one cutting insert is fastened across the distal end of the drill body.

However, the conventional indexable type cutting tool suffers from defects as described below. First, when fastening the cutting insert to the drill body, due to misalignment of the centers between the drill body and the cutting insert, precise setting cannot be ensured, whereby a machining precision cannot but be degraded when compared to the conventional solid type drilling tool.

Second, in order to precisely set the rotation centers of the cutting insert and the drill body, because a separate centering device is needed, a procedure for manufacturing the indexable type cutting tool is complicated, and a manufacturing cost increases.

Third, when coupling the cutting insert to the drill body, it is difficult to administrate an assembling precision.

DISCLOSURE OF INVENTION

Technical Problem

Accordingly, the present invention has been made keeping in mind the above problem occurring in the prior art, and an object of the present invention is to provide an indexable type cutting tool wherein an insert can be simply, quickly and precisely fastened to a tool body, and the through-hole of the insert is modified in its profile so that the rotation center of the insert can easily correspond to the rotation center of the tool body, whereby a manufacturing cost of the tool can be reduced due to easy manufacture of the tool, and it is possible to secure a sufficient chip discharge space, thereby improving a cutting performance of the tool.

Technical Solution

In order to achieve the above object, according to the present invention, there is provided an indexable type cutting tool comprising:

a drill having a shank and a drill body which extends integrally from the shank, the drill body being defined, on a circumferential outer surface thereof, with body flutes, and being formed, at a distal end thereof, with an insert seat which has seat side surfaces and a seat bottom surface, and, at both sides of the insert seat, with body flank surfaces and body thinning surfaces which are opposite to each other;

a drill insert fitted into the insert seat of the drill body, having at a distal end thereof cutting edges and at an opposite proximal end thereof an insert bottom surface which is brought into close contact with the seat bottom surface, formed between the cutting edges and the insert bottom surface with insert flutes and insert side surfaces which are brought into close contact with the seat side surfaces, and defined with a through-hole which passes through the insert side surfaces; and a fastening screw for fastening the drill insert fitted into the insert seat to the drill.

By the features of the present invention, the indexable type cutting tool according to the present invention provides advantages in that, since an insert can be simply, quickly and precisely fastened to a tool body and the through-hole of the insert is modified in its profile so that the rotation center of the insert can easily correspond to the rotation center of the tool body, a manufacturing cost of the tool can be reduced due to easy manufacture of the tool, and it is possible to secure a sufficient chip discharge space, thereby improving a cutting performance of the tool.

BRIEF DESCRIPTION OF THE DRAWINGS

FIG. 1 is an exploded perspective view illustrating an indexable type cutting tool in accordance with a first embodiment of the present invention;

FIG. 2 is an enlarged view illustrating the distal end of the drill body shown in FIG. 1;

FIG. 3 is a cross-sectional view taken along the line A-A of FIG. 1;

FIGS. 4 and 5 are views illustrating variations of the oil holes shown in FIG. 3;

FIG. 6 is an enlarged perspective view illustrating the drill insert shown in FIG. 1;

FIG. 7 is a front view of the drill insert shown in FIG. 6;

FIG. 8 is a side view of the drill insert shown in FIG. 6;

FIG. 9 is a plan view of the drill insert shown in FIG. 6;

FIG. 10 is a view illustrating an assembled state of the indexable type cutting tool shown in FIG. 1;

FIG. 11 is a transverse sectional view illustrating an assembled state of a fastening screw in the indexable type cutting tool shown in FIG. 10;

FIG. 12 is a longitudinal sectional view illustrating an assembled state of the fastening screw in the indexable type cutting tool shown in FIG. 10;

FIG. 13 is an enlarged view illustrating a through-hole of the drill insert shown in FIG. 6;

FIGS. 14 through 16 are views illustrating variations of the through-hole shown in FIG. 13;

FIG. 17 is an exploded perspective view illustrating an indexable type cutting tool in accordance with a second embodiment of the present invention;

FIG. 18 is an enlarged view illustrating a through-hole of the drill insert shown in FIG. 17; and FIGS. 19 and 20 are views illustrating variations of the through-hole shown in FIG. 18.

BEST MODE FOR CARRYING OUT THE INVENTION

Hereafter, indexable type cutting tools in accordance with preferred embodiments of the present invention will be described with reference to the attached drawings.

FIG. 1 is an exploded perspective view illustrating an indexable type cutting tool in accordance with a first embodiment of the present invention. The following descriptions will be given on the assumption that the upper end of the drawing indicates a distal end, the lower end of the drawing indicates a proximal end, the left side of the drawing indicates one side, and the right side of the drawing indicates the other side.

As shown in the drawing, the indexable type cutting tool 100 in accordance with the first embodiment of the present invention comprises a drill 200 which is usually mounted to an arbor (not shown) of a machine tool (not shown), a drill insert 300 which is locked to the distal end of the drill 200 to actually cut a ferrous or non-ferrous metal, and a fastening screw 400 for locking the drill insert 300 to the distal end of the drill 200.

FIG. 2 is an enlarged view illustrating the distal end of the drill body shown in FIG. 1.

Referring to FIGS. 1 and 2, the drill 200 includes a shank 210, and a drill body 220 which extends integrally from the shank 210. The drill body 220 is defined with body flutes 222.

An insert seat 224 for accommodating the drill insert 300 is formed on the distal end of the drill body 220 to extend in a longitudinal direction through a predetermined distance. The insert seat 224 has seat side surfaces 226 which face each other and a seat bottom surface 228. Preferably, the seat bottom surface 228 is formed to be perpendicular to the rotational axis of the drill 200. A marginal locking groove 230 which has a gap size smaller than a width of the insert seat 224 is defined on the seat bottom surface 228 to extend in the longitudinal direction. Body flank surfaces 232 are oppositely formed on both sides of the insert seat 224 at the distal end of the drill body 220, and body thinning surfaces 234 are oppositely formed on both sides of the insert seat 224 at front and rear sides of the body flank surfaces 232, respectively. The body flank surfaces 232 function to prevent interference between a workpiece and the drill body 220 when performing drilling work, and the body thinning surfaces 234 function to ensure easy discharge of chips.

Preferably, the body thinning surfaces 234 and the body flutes 222 are surface-treated to be prevented from abrading.

Meanwhile, fastening screw insertion holes 236 are defined at a position between the body flank surfaces 232 and the seat bottom surface 228 of the insert seat 224 to horizontally pass through the drill body 220. The fastening screw 400 for coupling the drill insert 300 to the insert seat 224 is inserted through the fastening screw insertion holes 236.

An external thread 410 is formed on one end of the fastening screw 400, and a head part 420 which has a countersunk configuration is formed on the other end of the fastening screw 400. In order to ensure that the fastening screw 400 is locked in the fastening screw insertion holes 236, an internal thread 238 is formed on the circumferential inner surface of one fastening screw insertion hole 236, and an inclined part 240 into which the head part 420 of the fastening screw 400 is fitted is formed on the circumferential inner surface of the other fastening screw insertion hole 236.

FIG. 3 is a cross-sectional view taken along the line A-A of FIG. 1. As shown in the drawing, the drill 200 has an oil guiding section 250 which is defined therein. The oil guiding section 250 has a first oil hole 252 which extends from the center of the proximal end of the shank 210 adjacent to the seat bottom surface 228, and second oil holes 254 which extend from the distal end of the first oil hole 252 toward the respective body flank surfaces 232. Cutting oil is guided through the oil guiding section 250 to dissipate the heat generated while performing the drilling work and ensure smooth discharge of the chips produced by performing the drilling work.

FIGS. 4 and 5 are views illustrating variations of the oil holes shown in FIG. 3.

First, referring to FIG. 4, the oil guiding section 250 has a first oil hole 252 and a second oil hole 254 which extend straight forward from two points on the distal end of the shank 210 to the respective body flank surfaces 232 formed at the distal end of the drill body 220. Second, referring to FIG. 5, the oil guiding section 250 has a first oil hole 252 and a second oil hole 254 which extend from two points on the distal end of the shank 210 to the respective body flank surfaces 232 formed at the distal end of the drill body 220 while having the same twisting angle as that of body flutes 222.

FIG. 6 is an enlarged perspective view illustrating the drill insert shown in FIG. 1, FIG. 7 is a front view of the drill insert shown in FIG. 6, FIG. 8 is a side view of the drill insert shown in FIG. 6, and FIG. 9 is a plan view of the drill insert shown in FIG. 6.

Referring to FIGS. 6 through 9, the drill insert 300 according to the present invention, is made of a cemented carbide or a material which is prepared by applying a ceramic-based coating film on the cemented carbide using a PVD or CVD coating method.

The drill insert 300 is formed, on the distal end thereof, with S-shaped cutting edges 310 which actually perform a cutting function. An insert bottom surface 312 is formed on the proximal end of the drill insert 300 which is opposite to the cutting edges 310. When the drill insert 300 is fitted into the insert seat 224 which are formed at the distal end of the drill body 220, the insert bottom surface 312 is brought into close contact with the seat bottom surface 228. That is to say, the insert bottom surface 312 has an outline which corresponds to that of the seat bottom surface 228.

Insert flutes 314 are formed between the cutting edges 210 and the insert bottom surface 212 to be oppositely positioned to each other while being centered on the cutting edges 310, and insert side surfaces 316 which are brought into close contact with the seat side surfaces 226 are formed to be oppositely positioned to each other while being similarly centered on the cutting edges 310. Further, in the drill insert 300, outer surfaces 318 which determine the diameter of the drill 200 and outer flank surfaces 320 for preventing excessive abrasion between the workpiece and the outer surfaces 318 while performing drilling work are formed between the insert side surfaces 316 which are oppositely formed to the insert flutes 314.

Moreover, cutting edge flank surfaces 322 are formed between the cutting edges 310 and the respective insert side surfaces 316 in such a way as to slope toward the respective insert side surfaces 316, and insert thinning surfaces 324 are formed between the cutting edge flank surfaces 322 and the respective insert flutes 314 in such a way as to slope from the cutting edge flank surfaces 322 toward the insert flutes 314.

The drill insert 300 is defined with a through-hole 326 which has a circular sectional shape and passes through the insert side surfaces 316 (see FIG. 13). The through-hole 326 of the drill insert 300 is composed of a through-hole roof part 328 and a through-hole bottom part 330. The through-hole 326 communicates with the fastening screw insertion holes 236 so that the fastening screw 400 can pass through the through-hole 326 and the fastening screw insertion holes 236. The through-hole 326 is defined such that it is perpendicular to the axis of the drill 200 and defines an angle 'α' when measured from the insert side surfaces 316 (see FIG. 9). The angle 'α' has a range of −5~45° when measured from a virtual axis '(Y)' which is perpendicular to any one of the insert side surfaces 316. Preferably, the through-hole 326 is designed and defined to have a rotational center which corresponds to that of the drill 200 and a diameter which is larger than that of the fastening screw 400. More preferably, a clearance 'a' of 0.005~0.1 mm is created between the through-hole roof part 328 and the circumferential outer surface of the fastening screw 400.

An assembled state of the indexable type cutting tool according to the present invention, constructed as mentioned above, will be simply described below.

FIG. 10 is a view illustrating an assembled state of the indexable type cutting tool shown in FIG. 1, FIG. 11 is a transverse sectional view illustrating an assembled state of a fastening screw in the indexable type cutting tool shown in FIG. 10, and FIG. 12 is a longitudinal sectional view illustrating an assembled state of the fastening screw in the indexable type cutting tool shown in FIG. 10.

Referring to FIGS. 10 through 12, in order to couple the drill insert 300 to the drill 200, the drill insert 300 is fitted into the insert seat 224 which is formed at the distal end of the drill body 220. In this state, the drill insert 300 is fastened to the insert seat 224 using the fasting screw 400.

At this time, the external thread 410 of the fastening screw 400 passes through the fastening screw insertion hole 236 which has the inclined part 240 and the through-hole 326 of the drill insert 300, is guided to the fastening screw insertion groove 236 which has the internal thread 238, and then is locked to the internal thread 238. When the drill insert 300 is fastened by the fastening screw 400, force F1 is applied between the seat side surfaces 226 to the insert side surfaces 316. Also, force F3 is applied between the inclined part 240 and the head part 420 of the fastening screw 400 which is fitted into the inclined part 240. As a consequence, the through-hole bottom part 330 of the through-hole 326 and the circumferential outer surface of the fastening screw 400 is brought into close contact with each other as indicated by the character 'c'. Therefore, force F2 is applied to the drill insert 300, as a result of which the insert bottom surface 312 is brought into close contact with the seat bottom surface 228, whereby it is possible to correspond the rotation center of the drill insert 300 to the rotation center of the drill 200 to accomplish an excellent centering precision.

FIGS. 14 through 16 are views illustrating variations of the through-hole shown in FIG. 13.

Referring to FIG. 14, the through-hole 326 is composed of a through-hole roof part 328 which has a size larger than the diameter of the fastening screw 400, a through-hole bottom part 330 which has a size smaller than that of the through-hole roof part 328, and through-hole side parts 332 which connect both ends of the through-hole roof part 328 and both ends of the through-hole bottom part 330 with each other. Hence, the through-hole side parts 332 radially converge from the through-hole roof part 328 toward the through-hole bottom part 330.

The through-hole roof part 328 is formed to have a curvature which is curved toward the proximal end of the drill insert 300, and the through-hole bottom part 330 is formed to have a curvature which is curved toward the distal end of the drill insert 300.

Referring to FIG. 15, the through-hole 326 is only composed of a through-hole roof part 328 which has a size larger than the diameter of the fastening screw 400, and through-hole side parts 332 which radially converge from both ends of the through-hole roof part 328 to the insert bottom surface 312 of the drill insert 300.

Referring to FIG. 16, the through-hole 326 is composed of a through-hole roof part 328 which has a size larger than the diameter of the fastening screw 400, and a through-hole bottom part 330 which has a size smaller than that of the through-hole roof part 328 and radially extends downwards from the through-hole roof part 328. The through-hole bottom part 330 comprises a recessed groove.

When the fastening screw 400 is locked through the through-hole 326 defined as described above, the circumferential outer surface of the fastening screw 400 presses the through-hole side parts 332 or the extended ends of the recessed groove. At this time, force F2 and F2' is applied to the through-hole side parts 332 or the extended ends of the recessed groove, as a result of which the insert bottom surface 212 is brought into close contact with the seat bottom surface 228, whereby it is possible to correspond the rotation center of the drill insert 300 to the rotation center of the drill 200 to accomplish an excellent centering precision. Predetermined clearances 'a' and 'b' are created between the fastening screw 400 and the through-hole roof part 328 and through-hole bottom part 330 to improve a coupling precision. The clearances 'a' and 'b' has a range of 0.01~3.0 mm.

FIG. 17 is an exploded perspective view illustrating an indexable type cutting tool in accordance with a second embodiment of the present invention, FIG. 18 is an enlarged view illustrating a through-hole of the drill insert shown in FIG. 17, and FIGS. 19 and 20 are views illustrating variations of the through-hole shown in FIG. 18.

Referring to FIGS. 17 through 20, the indexable type cutting tool 500 in accordance with the second embodiment of the present invention comprises an end mill 600 which is usually mounted to an arbor (not shown) of a machine tool (not shown), an end mill insert 700 which is locked to the distal end of the end mill 600 to actually cut a ferrous or non-ferrous metal, and a fastening screw 800 for locking the end mill insert 700 to the distal end of the end mill 600.

An insert seat 610 for accommodating the end mill insert 700 is formed on the distal end of the end mill 600. The insert seat 610 has seat side surfaces 612 which face each other and a seat bottom surface 614. Preferably, the seat bottom surface 614 is formed to be perpendicular to the rotational axis of the end drill 600. Fastening screw insertion holes 620 are defined through the end mill 600 adjacent to the distal end of the end mill 600 such that the fastening screw insertion holes 620 do not interfere with the seat bottom surface 614. The fastening screw 800 for coupling the end mill insert 700 to the insert seat 610 is inserted through the fastening screw insertion holes 620. An external thread 810 is formed on one end of the fastening screw 800, and a head part 820 which has a countersunk configuration is formed on the other end of the fastening screw 800. In order to ensure that the fastening screw 800 is locked in the fastening screw insertion holes 620, an internal thread 622 is formed on the circumferential inner surface of one fastening screw insertion hole 620, and an inclined part 624 into which the head part 820 of the fastening screw 800 is fitted is formed on the circumferential inner surface of the other fastening screw insertion hole 620.

The end mill insert 700 is formed, on the distal end thereof, with S-shaped cutting edges 710 which actually perform a cutting function. An insert bottom surface 712 is formed on the proximal end of the end mill insert 700 which is opposite to the cutting edges 710. When the end mill insert 700 is fitted into the insert seat 610, the insert bottom surface 712 is brought into close contact with the seat bottom surface 614. The end mill insert 700 is defined with a through-hole 720 which communicates with the fastening screw insertion holes 620 so that the fastening screw 800 can pass through the through-hole 720 and the fastening screw insertion holes 620.

The through-hole 720 is composed of a through-hole roof part 722 which has a size larger than the diameter of the fastening screw 800, a through-hole bottom part 724 which has a size smaller than that of the through-hole roof part 722, and through-hole side parts 726 which connect both ends of the through-hole roof part 722 and both ends of the through-hole bottom part 724 with each other. Hence, the through-hole side parts 726 radially converge from the through-hole roof part 722 toward the through-hole bottom part 724.

The through-hole roof part 722 is formed to have a curvature which is curved toward the proximal end of the end mill insert 700, and the through-hole bottom part 724 is formed to have a curvature which is curved toward the distal end of the end mill insert 700.

Preferably, the through-hole 720 is only composed of a through-hole roof part 722 which has a size larger than the diameter of the fastening screw 800, and through-hole side parts 726 which radially converge from both ends of the through-hole roof part 722 to the insert bottom surface 712 of the end mill insert 700.

More preferably, the through-hole 720 is composed of a through-hole roof part 722 which has a size larger than the diameter of the fastening screw 800, and a through-hole bottom part 724 which has a size smaller than that of the through-hole roof part 722 and radially extends downwards from the through-hole roof part 722. The through-hole bottom part 724 comprises a recessed groove.

Preferably, predetermined clearances 'a' and 'b' are created between the fastening screw 800 and the through-hole roof part 722 and through-hole bottom part 724 to improve a coupling precision. The clearances 'a' and 'b' has a range of 0.01~3.0 mm.

INDUSTRIAL APPLICABILITY

As is apparent from the above descriptions, in the indexable type cutting tools 100 and 500 according to the present invention, the through-holes 326 and 720 are defined in the inserts 300 and 700 such that the fastening screws 400 and 800 can be brought into contact at two points with the inner surfaces of the through-holes 326 and 720, and the profiles of the insert seats 224 and 610 into which the inserts 300 and 700 are inserted are modified such that the inserts 300 and 700 can be easily manufactured. Therefore, advantages are provided in that the inserts 300 and 700 and the drills 200 and 600 can be easily manufactured to reduce the manufacturing costs of the indexable type cutting tools 100 and 500, the rotation centers of the inserts 300 and 700 can easily correspond to the rotation centers of drills 200 and 600 without using a separate centering device, the inserts 300 and 700 can be replaced with new ones within a short time, and rotational vibration is minimized even while performing drilling work at a high rotational speed and a high cutting feed rate, thereby extending the lifetime of the cutting tools 100 and 500.

Further, due to the fact that the oil guiding section 250 is defined in the drill 200, a sufficient amount of cutting oil can be supplied, whereby it is possible to effectively dissipate the heat generated in the course of performing the drilling work. Also, because chips can be easily discharged, the lifetime of the cutting tool 100 is further extended, and machining precision and reliability can be improved.

Although preferred embodiments of the present invention have been described for illustrative purposes, those skilled in the art will appreciate that various modifications, additions and substitutions are possible, without departing from the scope and spirit of the invention as disclosed in the accompanying claim.

The invention claimed is:

1. An indexable type cutting tool comprising:
   a drill having a shank and a drill body which extends integrally from the shank, the drill body being defined, on a circumferential outer surface thereof, with body flutes, and being formed, at a distal end thereof with an insert seat which has seat side surfaces and a seat bottom surface, and, at both sides of the insert seat, with body flank surfaces and body thinning surfaces which are opposite to each other;
   a drill insert fitted into the insert seat of the drill body, having at a distal end thereof cutting edges and at an opposite proximal end thereof an insert bottom surface which is brought into close contact with the seat bottom surface, formed between the cutting edges and the insert bottom surface with insert flutes and insert side surfaces which are brought into close contact with the seat side surfaces, and defined with a through-hole which passes through the insert side surfaces; and
   a fastening screw for fastening the drill insert fitted into the insert seat to the drill;
   wherein the through-hole is composed of a through-hole roof part, a through-hole bottom part which has a size smaller than that of the through-hole roof part, and through-hole side parts which connect both ends of the through-hole roof part and both ends of the through-hole bottom part with each other; and the through-hole side parts extend such that they radially converge from the through-hole roof part to the through-hole bottom part.

2. The indexable type cutting tool as set forth in claim 1, wherein the seat bottom surface is formed to be perpendicular to an axis of the drill.

3. The indexable type cutting tool as set forth in claim 1, wherein a pair of fastening screw insertion holes which are aligned with each other and through which the fastening screw is inserted are defined through the drill body between the body flank surfaces and the seat bottom surface, an internal thread is formed on a circumferential inner surface of one fastening screw insertion hole, and an inclined part is formed on a circumferential inner surface of the other fastening screw insertion hole.

4. The indexable type cutting tool as set forth in claim 3, wherein an external thread which is locked with the internal thread is formed on one end of the fastening screw, and a head part which has a countersunk configuration and is fitted into the inclined part is formed on the other end of the fastening screw.

5. The indexable type cutting tool as set forth in claim 1, wherein the fastening screw passes through the through-hole and the fastening screw insertion holes which communicate with each other, and the through-hole is defined such that it is perpendicular to the axis of the drill and defines an angle of approximately −5° to 45° when measured from a virtual axis which is perpendicular to the insert side surfaces.

6. The indexable type cutting tool as set forth in claim 1, wherein the through-hole has a circular sectional shape which is composed of a through-hole roof part and a through-hole bottom part; and, when the fastening screw is inserted through the through-hole, a circumferential outer surface of the fastening screw is brought into contact with the through-hole bottom part, and a clearance of approximately 0.005 mm to 1.0 mm is defined between the circumferential outer surface of the fastening screw and the through-hole roof part.

7. The indexable type cutting tool as set forth in claim 1, wherein the through-hole is composed of a through-hole roof part which has a size larger than a diameter of the fastening screw, and through-hole side parts which radially converge from both ends of the through-hole roof part to the insert bottom surface of the drill insert.

8. The indexable type cutting tool as set forth in claim 1, wherein, when assembling the drill insert to the drill body using the fastening screw, a clearance of approximately 0.01 mm to 3.0 mm is defined between the circumferential outer surface of the fastening screw and the through-hole roof part or the through-hole bottom part of the through-hole.

9. The indexable type cutting tool as set forth in claim 1, wherein, in the drill insert, outer surfaces and outer flank surfaces are formed between the insert side surfaces which are opposite to the insert flutes, cutting edge flank surfaces are formed between the cutting edges and the insert side surfaces, and insert thinning surfaces are formed between the cutting edge flank surfaces and the insert flutes.

10. The indexable type cutting tool as set forth in claim 1, wherein the drill further has an oil guiding section which is defined in the drill to ensure easy dissipation and discharge of heat and chips generated and produced while performing drilling work.

11. The indexable type cutting tool as set forth in claim 1, wherein the body thinning surfaces and surfaces of the body flutes are surface-treated to be prevented from abrading.

12. The indexable type cutting tool as set forth in claim 1, wherein a marginal locking groove is defined on the seat bottom surface to extend in a longitudinal direction.

13. An indexable type cutting tool comprising:
a drill having a shank and a drill body which extends integrally from the shank, the drill body being defined, on a circumferential outer surface thereof, with body flutes, and being formed, at a distal end thereof with an insert seat which has seat side surfaces and a seat bottom surface, and, at both sides of the insert seat, with body flank surfaces and body thinning surfaces which are opposite to each other;
a drill insert fitted into the insert seat of the drill body, having at a distal end thereof cutting edges and at an opposite proximal end thereof an insert bottom surface which is brought into close contact with the seat bottom surface, formed between the cutting edges and the insert bottom surface with insert flutes and insert side surfaces which are brought into close contact with the seat side surfaces, and defined with a through-hole which passes through the insert side surfaces; and
a fastening screw for fastening the drill insert fitted into the insert seat to the drill;
wherein the through-hole is composed of a through-hole roof part which has a size larger than a diameter of the fastening screw, and a through-hole bottom part comprising a recessed groove which has a size smaller than that of the through-hole roof part and radially extends downwards from the through-hole roof part.

* * * * *